United States Patent [19]

Matsumoto et al.

[11] Patent Number: 5,531,908
[45] Date of Patent: Jul. 2, 1996

[54] GERM-FREE LIQUID DISPENSER

[75] Inventors: Nobuya Matsumoto, Osaka; Yasuhiro Morimura, Tokyo; Shinichi Kunisaki, Osaka; Goro Fujiwara, Osaka; Mitsunobu Masuda, Osaka; Masaru Kanazawa, Osaka, all of Japan

[73] Assignees: Suntory Limited; Takuma Co, Ltd., both of Osaka, Japan

[21] Appl. No.: 227,394

[22] Filed: Apr. 14, 1994

[30] Foreign Application Priority Data

Aug. 20, 1993 [JP] Japan .................................. 5-206001

[51] Int. Cl.$^6$ .................................. C02F 1/78; C02F 1/50
[52] U.S. Cl. .................. 210/760; 210/764; 210/198.1; 222/146.5; 222/146.6; 422/28
[58] Field of Search .................................. 210/760, 764, 210/198.1; 222/146.5, 146.6, 185; 422/28

[56] References Cited

U.S. PATENT DOCUMENTS

| | | |
|---|---|---|
| 2,434,190 | 1/1948 | Barnes et al. . |
| 2,692,855 | 10/1954 | Juda . |
| 3,382,039 | 5/1968 | Calmon et al. . |
| 3,853,761 | 12/1974 | McClory .................................. 210/419 |
| 4,270,994 | 6/1980 | Offlee, Sr. .................................. 222/63 |
| 4,844,796 | 7/1989 | Plester .................................. 210/100 |
| 4,968,439 | 11/1990 | Leveen et al. .................................. 210/764 |
| 5,106,495 | 4/1992 | Hughes .................................. 210/139 |
| 5,366,619 | 11/1994 | Matsui et al. .................................. 210/139 |
| 5,366,636 | 11/1994 | Marchin et al. .................................. 210/665 |

FOREIGN PATENT DOCUMENTS 62-28767  2/1987  Japan .

*Primary Examiner*—Neil McCarthy
*Attorney, Agent, or Firm*—Fisher & Associates

[57] ABSTRACT

A germ-free liquid dispenser is disclosed. The dispenser includes a liquid container having a liquid outlet opening, a reservoir for receiving and reserving the liquid from the container, a holder for detachably holding the liquid container at its supply posture for orienting its outlet opening downward to allow the liquid within the container to flow down through the opening into the reservoir, a dispenser device for dispensing the liquid from the reservoir by allowing the liquid to flow down from the reservoir, and an antibacterial element having an antibacterial surface capable of killing germ through a physical contact therewith. The antibacterial element is disposed inside the reservoir in such a manner as to contact the liquid inside the reservoir while allowing the reservoir to dispense the liquid therefrom.

11 Claims, 1 Drawing Sheet

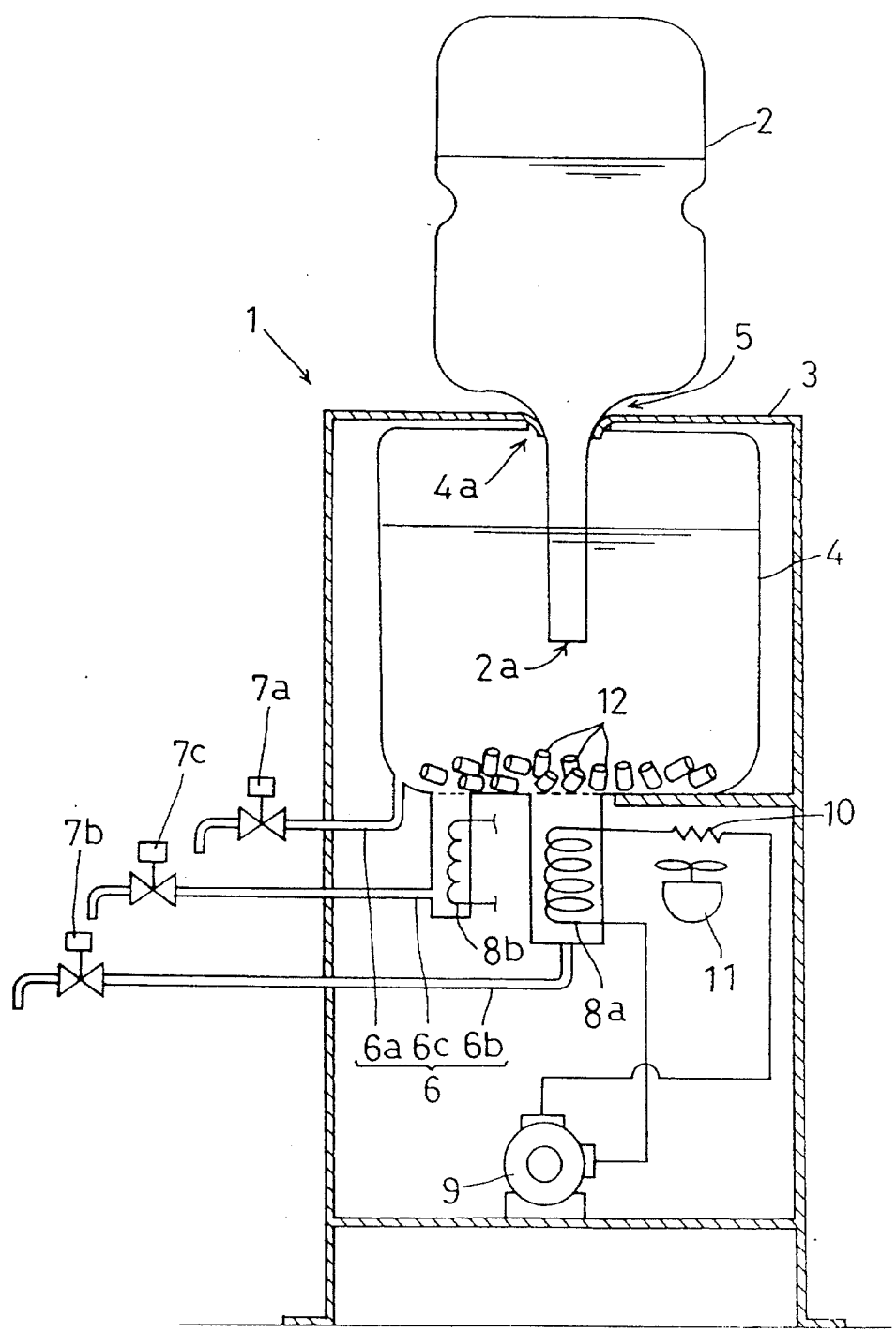

GERM-FREE LIQUID DISPENSER

BACKGROUND OF THE INVENTION

1. Field of the Invention

The present invention relates to a germ-free liquid dispenser for conveniently dispensing liquid such as mineral water or natural water reserved in the dispenser, and more particularly a liquid dispenser of the above type including a liquid container having a liquid outlet opening, a reservoir for receiving and reserving the liquid from the container, a holder means for detachably holding the liquid container at its supply posture for orienting its outlet opening downward to allow the liquid within the container to flow down through the opening into the reservoir, and a dispensing means for dispensing the liquid from the reservoir by allowing the liquid to flow down from the reservoir.

2. Description of the Related Art

With the liquid dispenser of the above-described type, the liquid is supplied from the liquid container held at the supply posture into the reservoir. This causes the level of the liquid inside the reservoir to rise thereby to allow the outlet opening of the liquid container to submerge in the level of the liquid reserved within the reservoir, thus liquid-sealing the outlet opening. Then, in this liquid-sealed condition, a pressure inside the container urging the liquid therein to flow downward comes into equilibrium with the atmospheric pressure acting on the surface of the liquid inside the reservoir, thereby to automatically inhibit further supply of the liquid from the container to the reservoir. When a portion of the liquid is dispensed from the reservoir, the liquid level inside this reservoir drops below the level of the outlet opening of the container. This breaks the above-described liquid-sealed condition under the equilibrium and allows air to enter through the outlet opening into the container. As a result, the pressure inside the liquid container increases to start supply of further liquid from the container into the reservoir.

The filling operation of the liquid into the liquid container is done in a sanitary manner at a factory under a strict quality control. Therefore, even if the liquid comprises mineral water or natural water which per se contains no germicide such as free chlorine therein, the germ-free condition of this liquid may be maintained as long as the liquid stays filled and sealed within the liquid container. However, after the liquid is removed from the container and reserved in the reservoir, rapid germ propagation occurs to due the contact of the liquid with the ambience air, since the liquid per se contains no germicide. Due to such germ propagation, there occur such inconveniences as muddiness of the liquid and deterioration of the taste of the liquid attributable to metabolite of the germ. And, of course, such germ propagation is undesirable from the hygienic point of view.

In order to restrict such undesirable germ propagation, the prior art has suggested charging germicide into the liquid, periodical flushing of the reservoir with hot water, or total draining and drying of the reservoir.

However, these conventional methods have presented new problems as follow.

In the case of the use of germicide, the germ propagation can be effectively prevented. Yet, this is done only at the expense of deterioration in the taste of the liquid.

In the case of the flushing method, substantially germ-free condition may be achieved immediately after the flushing operation. Yet, germ propagation inevitably occurs with lapse of time. Thus, in order to assure a satisfactorily safe liquid dispensing service, the flushing operation needs to be done before the propagation has developed significantly, which means that the operation is frequently needed. This is very troublesome and inefficient. Moreover, in order to flush the reservoir, any liquid remaining therein must be wastefully disposed of. Thus, this method suffers economical disadvantage as well.

The drying method is as troublesome as the flushing methods. Also, as again requiring the wasteful disposal of the remaining liquid, this method is uneconomical as well, if the liquid is expensive.

Taking the above-described state of the art into consideration, the primary object of the present invention is to provide an economical and convenient germ-free liquid dispenser which can dispense germ-free liquid without the necessity of wasteful disposal of the remaining liquid.

SUMMARY OF THE INVENTION

In, order to fulfill the above-identified object, a germ-free fluid dispenser according to the present invention comprises:

- a liquid container having a liquid outlet opening;
- a reservoir for receiving and reserving the liquid from the container;
- a holder means for detachably holding the liquid container at its supply posture for orienting its outlet opening downward to allow the liquid within the container to flow down through the opening into the reservoir;
- a dispensing means for dispensing the liquid from the reservoir by allowing the liquid to flow down from the reservoir; and
- an antibacterial element having an antibacterial surface capable of killing germ through a physical contact therewith, said element being disposed inside the reservoir in such a manner as to contact the liquid inside the reservoir while allowing the reservoir to dispense the liquid therefrom.

As described hereinbefore, in the case of the liquid dispenser of this type, with each dispensing operation of the liquid from the reservoir, there is generated movement of the liquid reserved therein and also with the breach of the liquid-sealed condition at the outlet opening of the container further liquid flows down from the container into the reservoir such that this further liquid flow stirs the remaining liquid inside the reservoir.

Taking this characteristics of the liquid dispenser into consideration, according to the present invention, an antibacterial element is disposed inside the reservoir. The element functions to kill germ in the reserved liquid through contact therewith. Further, movement of the reserved liquid caused in association with dispensing of the liquid serves to increase the opportunity of the contact between the element and the germ. Accordingly, the dispenser of the invention is capable of efficiently killing the germ in the liquid reserved in the reservoir, without any stirring device or excessively increasing an amount of the antibacterial element to be charged into the reserved liquid.

Consequently, the present invention has achieved an improved germ-free liquid dispenser capable of constantly and effectively preventing propagation of germ inside the reservoir thus constantly dispensing germ-free liquid without using germicide, necessitating troublesome operations such as flushing or draining/drying, wasteful disposal of the remaining liquid or further without deterioration in the taste of the liquid.

According to one aspect of the invention, a flow-down tube of the dispensing means is connected to a bottom of the reservoir, and a temperature-conditioning means is provided for conditioning temperature of the liquid at a base end of the flow-down tube. That is, heating or cooling can generate convection in the liquid reserved in the reservoir. Then, by conveniently utilizing the arrangement for obtaining heated or cooled liquid, it is possible to further increase the opportunity of the contact between the germ and the antibacterial surface.

Consequently, through the simple and inexpensive arrangement, it becomes possible to activate the liquid movement for further promoting the germ propagation preventing effect of the dispenser.

According to a further aspect of the invention, the antibacterial element comprises a resin element containing 5 to 30 wt % of antibacterial material prepared by combining an antibacterial metal ion with an ion exchanger through an ion exchange reaction. And, the antibacterial metal ion comprises silver ion alone or a combination of silver ion, copper ion and zinc ion.

More particularly, as such antibacterial material capable of killing germ through its physical contact therewith, there are known, e.g. an antibacterial material prepared by combining silver ion with such ion exchanger as zeolite through an ion exchange reaction, an antibacterial material prepared by combining silver ion, copper ion and zinc ion with an ion exchanger such as zeolite through an ion exchange reaction, an antibacterial material prepared by causing insoluble inorganic matter such as zirconium compound to carry silver ion, copper ion and zinc ion. And, it was proven that in these antibacterial materials the antibacterial metal ion such as silver ion, copper ion or zinc ion does not depart from the ion exchanger or the insoluble inorganic matter. Moreover, the research and experiments conducted by the present inventors have shown that in the resin element containing 15 to 30 wt % of the above-described antibacterial material the surface can retain antibacterial effect of sufficient strength with use of a minimal amount of the antibacterial material, so that the resin element is useful enough as the antibacterial element. Also, even with a resin element containing only 5 wt % of the antibacterial material the number of living germs in the liquid or the water can be restricted at a practical level below 1000 units/cc.

Therefore, if the above-described resin element is used as the antibacterial element, the antibacterial effect can be maintained for a long period of time and can also be restored simply by washing, so that the dispenser using this resin element can continue to dispense germ-free liquid in an economical manner without necessitating any maintenance operation such as replacement of the antibacterial element.

As described above, as the major component of the antibacterial material the antibacterial metal ion such as silver ion, copper ion or zinc ion does not depart from the ion exchanger or the insoluble inorganic matter and can continue to provide its antibacterial effect for an extended period of time and this effect can be readily restored by washing. Therefore, the mainteance of the antibacterial element is easy and economical.

According to a still further aspect of the present invention, the charging amount of the antibacterial element is adjusted such that a surface area of the antibacterial surface may exceed 90 square-centimeters per 1 (one) liter of liquid reserved in the reservoir.

That is, through the extensive experiments conducted by the present inventors, it has been shown, in the case of the liquid dispenser in which the reserved liquid is moved in association with each dispensing operation, that the surface area of the antibacterial element should be at least 90 square-centimeters in order to kill germs present in one liter of reserved liquid.

Based on this finding, with said setting of the surface area at not less than 90 square-centimeters per one liter of reserved liquid, the dispenser can reliably sterilize the reserved liquid. And, such reliable sterilizing effect can be expected with minimizing the amount of the antibacterial element.

Further and other objects, features and effects of the invention will become more apparent from the following more detailed description of the embodiments of the invention with reference to the accompanying drawings.

BRIEF DESCRIPTION OF THE DRAWING

FIG. 1 is a schematic view showing a construction of a germ-free liquid dispenser relating to the present invention.

DETAILED DESCRIPTION OF THE PREFERRED EMBODIMENTS

Preferred embodiments of a germ-free liquid dispenser will be described with reference to the accompanying drawing. In these embodiments, the dispenser is constructed as a germ-free drinking water dispenser for dispensing drinking water such as mineral water or natural water.

As shown in FIG. 1, the dispenser includes a body 1 and a bottle 2 as an example of a liquid container for supplying drinking water to the body 1. The bottle 2 includes an outlet opening 2a formed in a reduced diameter, i.e. neck portion of the bottle.

The body 1 includes a casing 3 which houses an assembly of a reservoir 4 for receiving and reserving the drinking water from the bottle 2, a holder means for detachably holding the bottle 2 at its supply posture, a dispensing means for dispensing the drinking water by causing the water reserved at the reservoir 4 to flow downwards, a temperature conditioning means and a sterilizing means. The reservoir 4 includes an inlet opening 4a at an upper position thereof.

The holder means detachably holds the bottle 2 at its supply posture in which its outlet opening 2a is oriented downwards and is inserted from the above into the reservoir 4 so as to allow the drinking water filled in the bottle 2 to flow down into the reservoir 4. In a top plate of the casing 3, there is formed an opening 5 for allowing insertion from the above of the opened neck portion of the inverted bottle 2 with its outlet opening 2a oriented downward while the large diameter portion of the bottle being rested on the periphery of the opening 5.

Then, as the bottle 2 is held at the above-described supply posture, air enters through the opening 2a into the bottle 2 to cause the water in the bottle 2 to flow down into the reservoir 4. With this, the water level in the reservoir 4 rises and the outlet opening 2a becomes submerged in the water, thereby to prevent entrance of further air through the opening 2a into the bottle 2. So that, the pressure inside the bottle 2 (i.e. the sum of the water head pressure of the water in the bottle 2 and the air pressure in the bottle 2) which pressure urges the water to flow down into the reservoir 4 is gradually decreased until this pressure comes into equilibrium with an atmospheric pressure acting on the surface of the water in the reservoir. This automatically ceases the supply of the drinking water from the bottle 2 to the reservoir 4. Then, when a portion of the water is dispensed from the reservoir 4, the level of the water in the reservoir drops to break the water-sealed condition of the outlet opening 2a thereby to allow air to enter through the opening 2a into the bottle 2. With this entrance of the air, the pressure inside the bottle 2 exceeds the atmospheric pressure acting on the water surface in the reservoir 4, thereby to automatically start supplying water from the bottle 2 into the reservoir 4. This supply of water, in the same manner described above, is automatically stopped when the water level in the reservoir rises to seal the opening 2a and the pressure in the bottle 2 comes into equilibrium with the atmospheric pressure.

The dispensing means comprises a flow-down tube means 6 for dispensing the water from the reservoir 4. The flow-down tube means 6 includes three flow-down tubes 6a, 6b and 6c for dispensing natural-temperature water, cooled water and heated water, respectively. These tubes 6a, 6b and 6c are connected to a bottom of the reservoir 4 and openable/closable stopcocks 7a, 7b and 7c are attached to the leading ends of the tubes 6a, 6b and 6c, respectively.

The temperate ire-conditioning means is provided for cooling the water dispensed through the cooled-water dispensing tube 6b and for heating the water dispensed through the heated-water dispensing tube 6c. Specifically, this temperature-conditioning means includes a heat-pump evaporator 8a incorporated at a large-diameter base end portion of the cooled-water dispensing tube 6b and an electric heater (sheathed heater) 8b incorporated at a large-diameter base end portion of the heated-water dispensing tube 6c. Reference numerals 9, 10 and 11 denote a compressor, a condenser and a radiator fan, respectively.

The sterilizing means is provided for sterilizing the drinking water inside the reservoir 4. Specifically, this sterilizing means comprises a plurality of cylindrical antibacterial elements 12 each having an antibacterial surface capable of killing germ in the water through physical contact therewith; and these elements 12 are disposed inside the reservoir 4 in such a manner that the elements are placed in contact, with the water in the reservoir while allowing dispensing of the same from the reservoir.

The antibacterial element 12 comprises a resin element containing 5 to 30 wt % of antibacterial material. For instance, this element 12 can be a cylindrical element having dimensions of 2.5 cm inner diameter, 3.8 cm length, 0.1 cm thickness and approximately 64 cm$^2$ surface area.

The charging amount of the antibacterial elements 12 is get so that the total surface area of the charged elements exceed 90 square centimeters per 1 (one) liter of the water reserved in the reservoir 4.

Preferably, the resin material forming the antibacterial element 12 comprises thermosetting resin or thermoplastic resin such as unsaturated polyesther, epoxy, polypropylene, and polyethylene.

Preferably, the antibacterial material is prepared by combining silver ion selected from the group of antibacterial metal ions including silver ion, copper ion and zinc ion with an ion exchanger through an ion exchange reaction, or by combining silver ion, copper ion and zinc ion with an ion exchanger through an ion exchange reaction, or by causing an insoluble inorganic substance to carry silver ion, copper ion and zinc ion, or by causing an insoluble inorganic substance to carry silver ion, copper ion and zinc ion. The ion exchanger can be zeolite or an ion exchanger rein. The insoluble, inorganic substance can be zirconium compound, for instance.

According to the above-described construction, in response to dispensing of a portion of water from the reservoir, there is generated a convection in the reserved water and supply of water from the bottle 2 to the reservoir 4 causes stirring of the reserved water. Further, heating or cooling of the water at the base end portion of the tube 6b or 6c causes further stirring of the reserved water. All these serve to increase the opportunity of contact between germ in the reserved water and the surfaces of the antibacterial elements 12, so that sterilization of the water can be effected in an efficient manner.

In order to confirm the sterilizing effect achieved by the antibacterial element 12 charged into the reservoir 4, the present inventors conducted an experiment, which will be discussed next.

The antibacterial element 12 used in the experiment had the dimensions of 2.5 cm inner diameter, 3.8 cm length, 0.1 cm thickness and approximately 64 cm$^2$ surface area and had a cylindrical shape. The antibacterial material contained in this element 12 comprised the combination of zeolite and silver ion provided by an ion exchange reaction. The resin component was unsaturated polyester rein. Then, four types of antibacterial elements 12 were prepared differing in the antibacterial material contents as 5 wt %, 10 wt %, 15 wt % and 30 wt %, respectively.

Further, the experiment used a square-shaped reservoir 4 of 30 cm width, 30 cm depth and an effective water depth of 15 cm, and 13.5 liters of water was reserved in this reservoir 4. Then, the experiment covered eight different cases using 20 or 30 units of the four types of antibacterial elements. Then, observations were made for variations in the number of living germs with lapse of days.

Referring more particularly to the observations, the stopcocks of the dispenser were opened in a random order to dispense 2 liters of the reserved water from each dispensing faucet. Then, samples were obtained from each faucet. The measurement of the number of living germs present in each sample was done by using a standard agar cultivation medium, and the numbers were counted for those which formed a colony in the medium after cultivation for 48 hours at 36 degrees in Celsius. Following Table 1 shows the results of the experiment up to the lapse of 60 days.

For comparison, an experiment was conducted in the same manner for a case without using any antibacterial elements 12 at all in the reservoir 4. Table 2 shows the results of this experiment up to the lapse of 10 days.

In the tables, numerals denote the number of detected living germs present in 1 cc of the water sampled from the reservoir 4. A reference mark 'ND' denotes no detection of any living germs.

As may be seen from Table 1, if the reservoir 4 is charged with 20 to 30 units of antibacterial elements 12 containing 15 to 30 wt % of the antibacterial material, the drinking water reserved in the reservoir 4 can be maintained germ-free for at least 60 days. Further, in case the antibacterial elements 12 contain only 5 to 10 wt % of the antibacterial material, the germ-free condition of the reserved water can be maintained for a period of 1 week to 1 month.

In the above-described embodiment, the temperature-conditioning means is capable of both heating and cooling. Instead, it is also conceivable for this means to effect only either heating or cooling.

TABLE 1

| days lapsed | antibacterial material content | | | | | | | |
|---|---|---|---|---|---|---|---|---|
| | 5% | | 10% | | 15% | | 30% | |
| | charging amount | | | | | | | |
| | 20 units | 30 units | 20 units | 30 units | 20 units | 30 units | 20 units | 30 units |
| | number of living germs | | number of living germs | | number of living genus | | number of living germs | |
| 1 | ND | ND | ND | ND | ND | ND | ND | ND |
| 2 | ND | ND | ND | ND | ND | ND | ND | ND |
| 4 | ND | ND | ND | ND | ND | ND | ND | ND |
| 6 | $1.7 \times 10^2$ | ND | ND | ND | ND | ND | ND | ND |
| 8 | $1.9 \times 10^2$ | ND | ND | ND | ND | ND | ND | ND |
| 10 | $2.5 \times 10^2$ | $2.5 \times 10^2$ | ND | ND | ND | ND | ND | ND |
| 30 | $5.4 \times 10^2$ | $5.4 \times 10^2$ | $2.4 \times 10^2$ | ND | ND | ND | ND | ND |
| 60 | $6.9 \times 10^2$ | $5.7 \times 10^2$ | $2.9 \times 10^2$ | $1.5 \times 10^2$ | ND | ND | ND | ND |

TABLE 2

| days lapsed | comparison reference |
|---|---|
| 1 | 0 |
| 2 | $2.3 \times 10^2$ |
| 4 | $1.1 \times 10^4$ |
| 6 | $2.1 \times 10^4$ |
| 8 | $3.4 \times 10^4$ |
| 10 | $4.1 \times 10^5$ |

In the above embodiment, the dispenser is equipped with the temperature-conditioning means. Yet, the present invention can be embodied as a dispenser without such temperature-conditioning means.

Further, the above embodiment relates to a drinking-water dispenser. Instead, the present invention may be embodied as a dispenser for dispensing any other liquid than drinking water.

The antibacterial element 12 can be any other shape than the cylindrical shape disclosed in the foregoing embodiment. For instance, the element can be square-shaped, spherical-shaped and so on. In addition, this element 12 can be formed like a string or bar-like element. That is to say, the shape and size of the antibacterial element 12 can be varied depending on the convenience. Also, in order to reduce cost by decreasing the charging amount of the element into the reservoir 4, it is preferred that each element 12 should be small but should have a relatively large surface area.

For making the most of the liquid dispenser of the present invention, it is recommended that an initial sterilization operation be effected when the liquid container 2 is replaced. For, it is difficult to effect such container replacement operation under a germ-free condition in the case of the liquid container which can be used in a variety of environments.

As a further method of sterilization, it is also conceivable to use a conventional compact ozone generator for directly feeding ozone into the liquid reserved in the reservoir 4. Through appropriate control of the feeding amount of ozone as the initial sterilization, the fed ozone can be naturally dissolved in the water within a few hours. Accordingly, it is necessary to prevent the water from being dispensed for drinking until a predetermined time period has lapsed after the initial sterilization ho allow ozone to dissolve to be harmless.

Referring to specific processes of this ozone injection, after the used liquid container 2 is dismounted from the body 1, ozone-containing gas is injected into the remaining water in the reservoir 4 through the inlet opening 4a of the reservoir 4. Thereafter, a new liquid container 2 is mounted to the body 1. According to an alternative method, it is conceivable to form ozone injection openings with a lid in the casing 3 and at a position different from the inlet opening 4a of the reservoir 4. In this case, the injection operation of ozone-containing gas is possible with the old or new liquid container 2 being set to the body 1.

In the foregoing embodiment, the antibacterial element 12 comprises the plurality of cylindrical elements. Instead, it is conceivable to construct the element in the form of a basket-like assembly including a mesh bottom and/or side faces. Then, this assembly will be put into the reservoir by opening a lid provided to the top of the reservoir. With this construction, the effective contact between the antibacterial element and the liquid in the reservoir is not limited to the area adjacent to the bottom of the reservoir. Therefore, this construction will achieve an even higher germ-killing effect. This construction is advantageous also for facilitating the maintenance operation such as a washing operation, since the element can be readily withdrawn from the container.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which become within the meaning and range of equivalency of the claims are therefore intended to be embraced therein.

What is claimed is:

1. A germ-free liquid dispenser comprising:

a liquid container having a liquid outlet opening;

a reservoir for receiving and reserving liquid from said container;

a holder means for detachably holding said liquid container at a supply posture for orienting said liquid outlet opening downward to allow said liquid within said container to flow down through said liquid outlet opening into said reservoir;

a dispensing means for dispensing said liquid from said reservoir by allowing said liquid to flow down from said reservoir; and an antibacterial element having an antibacterial surface capable of killing germs through a physical contact therewith, said element being disposed inside said reservoir in such a manner as to contact said liquid inside said reservoir while allowing said reservoir to dispense said liquid therefrom, said antibacterial element comprising a resin substrate containing 5 to 30 wt % of antibacterial material prepared by combining an antibacterial metal ion with an ion exchanger through an ion exchange reaction, said antibacterial metal ion comprising silver ions alone or a combination of silver, copper and zinc ions;

wherein a flow-down tube of said dispensing means is connected to a bottom of said reservoir, and a temperature-conditioning means is provided for conditioning temperature of said liquid at a base end of said flow-down tube.

2. A germ-free liquid dispenser as defined in claim 1, wherein said ion exchanger comprises zeolite.

3. A germ-free liquid dispenser as defined in claim 1, wherein said resin substrate of said antibacterial element comprises a thermosetting resin or thermoplastic resin.

4. A germ-free liquid dispenser as defined in claim 1, wherein a charging amount of said antibacterial element is adjusted such that a surface area of said antibacterial surface exceeds 90 square-centimeters per 1 (one) liter of liquid reserved in said reservoir.

5. A germ-free liquid dispenser as defined in claim 1, wherein said antibacterial element comprises a resin substrate containing 5 to 30 wt % of an antibacterial material prepared by causing insoluble inorganic matter to carry an antibacterial metal ion, said antibacterial metal ion comprising silver ions alone or a combination of silver, copper and zinc ions.

6. A germ-free liquid dispenser as defined in claim 5, wherein said resin substrate of said antibacterial element comprises a thermosetting resin or thermoplastic resin.

7. A germ-free liquid dispenser as defined in claim 5, wherein a charging amount of said antibacterial element is adjusted such that a surface area of said antibacterial surface exceeds 90 square-centimeters per 1 (one) liter of liquid reserved in said reservoir.

8. A germ-free liquid dispenser as defined in claim 1, wherein a flow-down tube of said dispensing means is connected to a bottom of said reservoir, and a temperature-conditioning means is provided for conditioning temperature of said liquid at a base end of said flow-down tube; and said temperature conditioning means comprises either a heating means alone or a combination of said heating means and a cooling means, said heating means being provided at a first large-diameter base end portion of said flow-down tube, said first large-diameter base end portion of said flow-down tube being directly connected with said reservoir; said cooling means being provided at a second large-diameter base end portion of said flow-down tube, said second large-diameter base end portion of said flow-down tube being directly connected with said reservoir.

9. A germ-free liquid dispenser as defined in claim 8, wherein said cooling means comprises means for cooling said liquid dispensed through a cooled-water dispensing tube and including a heat pump evaporator incorporated at said second large-diameter base portion of said cooled water dispensing tube; and said heating means comprising means for heating said liquid dispensed through a heated-water dispensing tube and including an electric heater incorporated at said first large diameter base end portion of said heated water dispensing tube.

10. A method of replacing a liquid container of a germ-free liquid dispenser, said liquid dispenser comprising a liquid container having a liquid outlet opening; a reservoir for receiving and reserving liquid from said container; a holder means for detachably holding said liquid container at a supply posture for orienting said liquid outlet opening downward to allow said liquid within said container to flow down through said liquid outlet opening into said reservoir; a dispensing means for dispensing said liquid from said reservoir by allowing said liquid to flow down from said reservoir; and an antibacterial element having an antibacterial surface capable of killing germs through a physical contact therewith, said element being disposed inside said reservoir in such a manner as to contact said liquid inside said reservoir while allowing said reservoir to dispense said liquid therefrom, said antibacterial element comprising a resin substrate containing 5 to 30 wt % of antibacterial material prepared by combining an antibacterial metal ion with an ion exchanger through an ion exchange reaction, said antibacterial metal ion comprising silver ions alone or a combination of silver, copper and zinc ions, said method comprising the steps of:

initially sterilizing said liquid inside said reservoir by injecting ozone containing gas into said liquid when said liquid container is replaced.

11. The method recited in claim 10, further comprising the steps of:

dismounting a used liquid container from said holder means;

injecting an ozone-containing gas into said liquid remaining in said reservoir through an inlet opening of said reservoir; and mounting a new liquid container to said holder means.

* * * * *